United States Patent [19]

Turner

[11] Patent Number: 4,631,587
[45] Date of Patent: Dec. 23, 1986

[54] FIELD RESPONSIVE VERTICAL PULSE GENERATOR

[75] Inventor: Rudolf Turner, Vernon Hills, Ill.

[73] Assignee: Zenith Electronics Corporation, Glenview, Ill.

[21] Appl. No.: 702,534

[22] Filed: Feb. 19, 1985

[51] Int. Cl.[4] ............................................. H04N 7/04
[52] U.S. Cl. .................................... 358/148; 358/154; 358/158
[58] Field of Search ................ 358/148, 153, 154, 158

[56] References Cited

U.S. PATENT DOCUMENTS 4,245,251  1/1981  Steckler et al. ..................... 358/158
4,498,103  2/1985  Aschwanden ....................... 358/148

Primary Examiner—James J. Groody
Assistant Examiner—Michael D. Parker

[57] ABSTRACT

In an NTSC television system there are an odd number (262.5) of horizontal lines in each field. This relationship causes a 50% duty cycle horizontal rate signal (H) to be high during one specific horizontal half line in one field and low for that same horizontal half line in the other field. A 2H rate signal is normally divided by 525 with counters to obtain a field rate. The outputs of the counters are combined with a regenerated horizontal rate signal (H) to generate a plurality of unique addresses. This provides a mapping for each field to within a half horizontal line resolution. These addresses can be decoded by a programmable logic device or other devices to define half, single or groups of horizontal lines in one or both fields.

8 Claims, 6 Drawing Figures

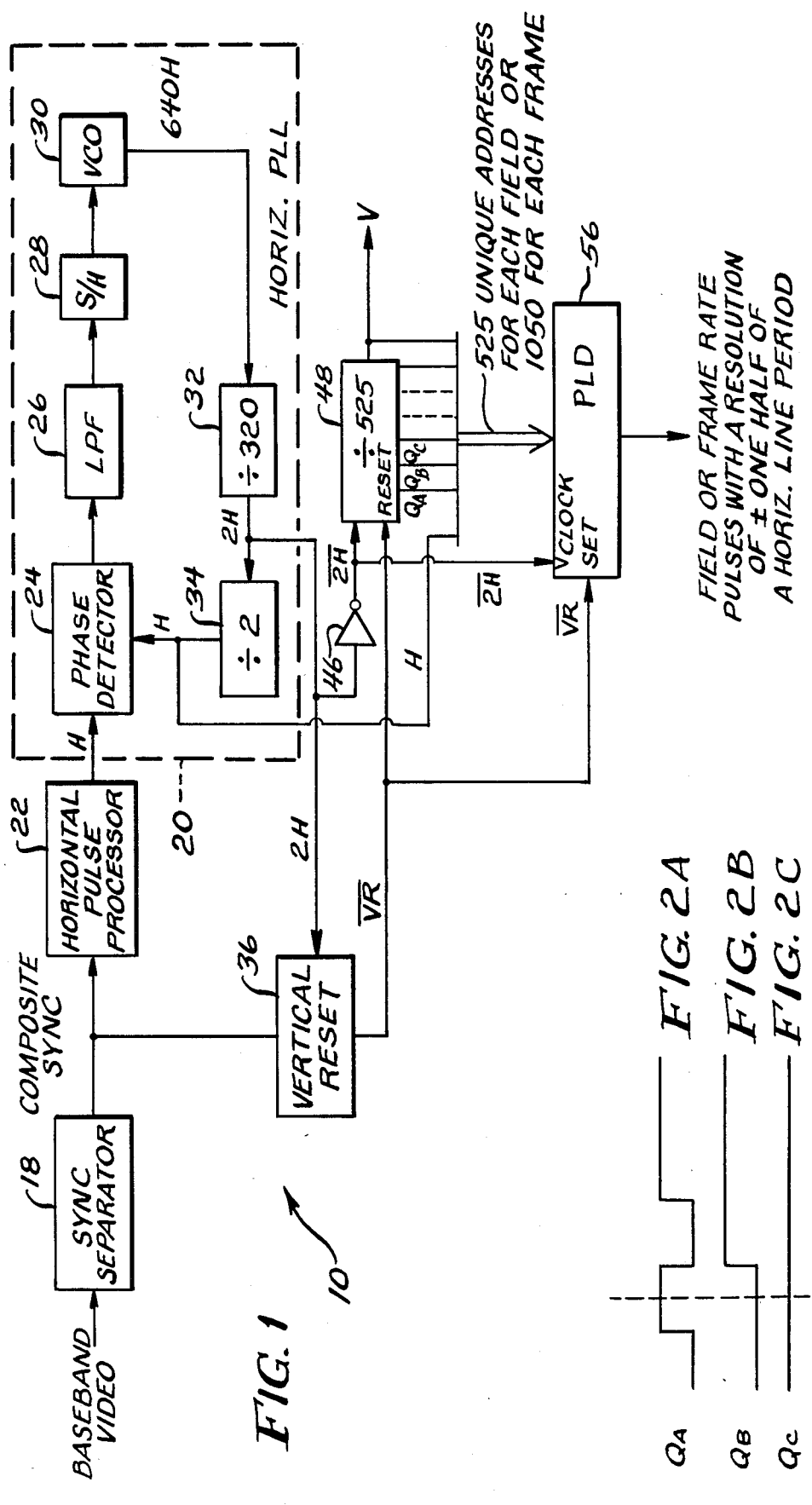

FIELD RESPONSIVE VERTICAL PULSE GENERATOR

CROSS-REFERENCE TO RELATED APPLICATION

This application is related to but in no way dependent upon the following application which is assigned to the assignee of the present application and filed in the name of the present inventor: Ser. No. 662,219, filed Oct. 18, 1984, entitled "Vertical Reference Signal Identification System" and issued Aug. 13, 1985 as U.S. Pat. No. 4,535,353.

BACKGROUND OF THE INVENTION

This invention relates generally to the processing of composite video signals and is particularly directed to the generation of selected field or frame rate signals in response to a composite video signal.

The non-video, or retrace, portion of composite video signals is increasingly being used for the transmission of data. For example, some cable television (CATV) systems use the vertical blanking interval (VBI) to transmit "downstream" data from the system headend to individual subscribers. This data may include subscriber address information, viewer authorization instructions, subscriber polling signals, and video signal control data relating to such signal parameters as sync suppression and video signal inversion. In order for this data to be accurately detected, it must be transmitted in precise timed relation with respect to the vertical sync interval.

To ensure proper timing of the transmitted and received data the communications system must be capable of accurately detecting the lines during which the data is transmitted. In the NTSC system, the vertical or field rate is equal to 262.5 horizontal lines, with two interlaced fields comprising each frame. Prior art approaches for generating a vertical or field rate signal generally involve dividing a 2X horizontal rate (2H) signal by 525. Since two fields form one frame, frame rate is obtained by dividing vertical by 2. This approach involves the use of complicated counting arrangements for generating these vertical reference signals.

The present invention represents an improvement over the prior art by providing a simplified arrangement for precisely defining pulses at field or frame rates to be used in the processing of a composite video signal. The present invention makes use of timing signals generated by horizontal and vertical processing circuitry for precisely defining leading and trailing edges of the thus generated vertical pulses.

OBJECTS OF THE INVENTION

Accordingly, it is an object of the present invention to provide for the accurate generation of vertical or frame rate pulses in a raster-scanned video display system responsive to composite video signals.

It is another object of the present invention to provide an arrangement for differentiating between odd and even fields in an interlaced, raster-scanned video display system without further dividing the vertical rate signal by two to form a frame rate.

It is yet another object of the present invention to accomplish the above by using a regenerated horizontal rate component H of a composite video signal.

A further object of the present invention is to provide for the generation of vertical or frame rate pulses in a raster-scanned video display system to within a half horizontal line resolution.

A still further object of the present invention is to provide for the accurate transmission of data during the vertical blanking interval of a composite video signal.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings in which:

FIG. 1 is a simplified block diagram of a vertical pulse generator capable of differentiating even and odd fields in a raster-scanned video display system in accordance with the present invention; and FIGS. 2A-2E illustrate various combinations of the several outputs from the vertical counter as well as a "field-alternating" horizontal rate signal. These signals are combined together to form a plurality of unique addresses. A programmable logic device is used to decode these addresses into desired vertical or frame rate signals in accordance with the present invention.

DETAILED DESCRIPTION OF THE PREFERRED EMBODIMENT

Referring to FIG. 1, there is shown in simplified block diagram form a vertical pulse generator 10 in accordance with the present invention. While the vertical pulse generator 10 is particularly adapted for use in a cable television (CATV) encoder, it has application in any composite video signal receiving apparatus where it is desired to identify individual or groups of horizontal scan lines in the composite video signal and generate vertical or frame rate pulses to within a ½ horizontal line resolution.

In the vertical pulse generator 10, a baseband composite video signal is provided to a sync separator 18 for removing the composite sync signal from the composite video signal. The sync separator 18 is generally responsive to the negative-going sync pulses and typically detects the various sync pulses by means of a threshold level detection arrangement set just above the clamped sync tip level. The composite sync signal from the sync separator 18 is provided to a horizontal phase lock loop (PLL) 20 via a horizontal pulse processor 22.

The horizontal pulse processor 22 receives the composite sync signal and looks at only the first and last ⅛ portions of a horizontal line for a horizontal sync pulse. This reduces the possibility of noise pulses in the middle of a horizontal line causing the horizontal PLL 20 to lock onto an erroneous sync signal. The horizontal pulse processor 22 removes the 2H rate component from the composite sync signal and provides an H rate signal to a phase detector or mixer 24 within the horizontal PLL 20. The 2H rate signal is removed by triggering a monostable multivibrator (not shown) in the horizontal pulse processor 22 where the pulse width of the monostable multivibrator is set for ¾H. The output of the phase detector 24 is provided to a low pass filter (LPF) 26 and thence to a sample and hold (S/H) circuit 28. The output of the S/H circuit 28 is provided to a voltage controlled oscillator (VCO) 30, the output of which is at a 640H rate. The VCO output is then divided by the horizontal counting chain composed of a divide-by-320 circuit 32 and a divide-by-2 circuit 34. The resulting regenerated horizontal signal, H, is then fed back to the phase detector 24.

The LPF 26 filters out the sum frequencies generated in the phase detector 24 by the horizontal rate signals provided thereto. The difference signals generated in the phase detector 24 are essentially 0. The phase detector 24 locks onto the leading edge of horizontal sync, with the S/H circuit 28 permitting the error signal of the phase detector during the sync pulse to be stored for an entire horizontal line. The output of the S/H circuit 24 is a control voltage for regulating the frequency of the VCO 30. The VCO output is at 640H which is fed back as a horizontal rate signal H via the aforementioned horizontal counting chain to the phase detector 24. In this manner, the phase detector 24 provides an output to the LPF 26 according to the difference in frequency and phase between the reference output of the VCO 30 and the horizontal rate signal output from the horizontal pulse processor 22. The horizontal PLL 20 is thus locked in frequency and phase to the leading edge of the composite sync signal. The 640H output signal from the VCO 30 is typically used for generating various horizontal rate signals utilized in the processing of the composite video signal which does not form a part of the present invention and is therefore not discussed further herein.

The 2H output of the horizontal counting chain which constitutes part of the horizontal PLL 20 is provided to a vertical reset circuit 36. Also provided to the vertical reset circuit 36 from the sync separator 18 is the composite sync signal. The vertical reset circuit 36 in response to the two signals provided thereto generates a vertical reference signal ($\overline{VR}$) at the vertical rate. In a preferred embodiment, the vertical reset circuit 36 samples the composite sync signal with the positive-going edge of the 2H pulse. The composite sync signal will only be high on a positive-going edge of the 2H pulse during the vertical sync pulse in the composite sync signal. The vertical reset circuit 36 counts six 2H pulses to establish a precise three horizontal line reference. If the width of the vertical sync interval from the first encountered broad pulse to the last, without the occurrence of any discontinuities as defined by a high sample obtained by the positive transition of the 2H pulse, is equal to the three horizontal lines, then the vertical reset signal ($\overline{VR}$) occurs. In essence, the $\overline{VR}$ is time-wise referenced to the vertical sync pulse of the composite sync signal. Since there are many ways in which a vertical reference signal may be generated in response to receipt of a composite sync signal and the horizontal rate portion thereof, the details of the vertical reset circuit 36 do not form a part of the present invention and are not further discussed herein. The details of a vertical reset circuit utilized in a preferred embodiment of the present invention may be found in the above cross-referenced related application entitled "Vertical Reference Signal Identification System".

An inverted 2H output of the horizontal counting chain comprised of the horizontal pulse processor 22 and the horizontal PLL 20 is provided via an inverter 46 to a vertical counting chain 48. An inverter is used to prevent the vertical reset pulse which is based on the positive-going transition of the 2H pulse from occurring at the same time as the $\overline{2H}$ clock pulse of the counters. In other words, $\overline{VR}$ can land anywhere in a half of a horizontal line time slot without disturbing the count. The vertical counting chain 48 includes three 4-bit synchronous counters (not shown) which are coupled in a cascaded arrangement. The $\overline{2H}$ rate output signal from the horizontal counting chain is provided to each of the clock inputs of these counters and the vertical reference output $\overline{VR}$ of the vertical reset circuit 36 is provided to the reset input of each of these counters to force vertical synchronization. The vertical counting chain 48 divides the $\overline{2H}$ output of the horizontal counting chain by 525 to generate a vertical rate signal V.

The vertical counting chain 48 also outputs a plurality of signals $Q_A$, $Q_B$, $Q_C$, etc., each of which represents a respective output from one of the aforementioned vertical counters therein. For example, in a preferred embodiment the $Q_A$ output represents the least significant bit (LSB), the $Q_B$ output represents the second LSB, and $Q_C$ represents the third LSB, and so on. The combination of the various Q outputs of the vertical counting chain 48 may, in turn, be used to identify half of a horizontal line in both fields, but not the same half in each field. Because of the odd relationship between horizontal lines and fields, the address formed to define a specific horizontal half line in one field will not result in that same horizontal half line in the other field. This is based on dividing each field into 262.5 specific lines. By also providing the H output from the horizontal PLL 20 which is alternately high and low in the same horizontal half line for the even and odd fields to a programmable logic device 56, the 525 unique addresses for a given field representing individual horizontal half lines therein, may be doubled to 1050 uniquely coded signals for identifying a specific horizontal line within each of the even and odd fields. An example of an aforementioned coded signal provided by the vertical counting chain 48 is shown in FIGS. 2A through 2E. FIGS. 2A, 2B and 2C illustrate various $Q_A$, $Q_B$ and $Q_C$ outputs from the vertical counting chain 48. In the example shown, only the $Q_A$ output from the vertical counting chain 48 is HIGH at time $T_O$. As shown in FIG. 2D, the H rate signal is also HIGH during the odd field. From FIG. 2E, it can be further seen that the H rate signal is low during the even field. Thus, from these signal timing diagrams it can be seen that while the $Q_A$, $Q_B$ and $Q_C$ outputs from the vertical counting chain 48 may be used to represent a given line in one field (it will be a half horizontal line off in the other field), the H rate signal provides the missing information to represent either the odd or even field. Therefore, the combination of the Q outputs of the vertical counting chain 48 and the H signal output from the horizontal PLL 20 may be used to represent a given horizontal line within either the odd or the even field.

The H rate signal output from the horizontal PLL 20 as well as the $Q_A$, $Q_B$, $Q_C$, etc., outputs of the vertical counting chain 48 are provided to the inputs of the programmable logic device (PLD) 56. The PLD 56 is a programmable logic device containing programmable gate arrays with clocked set/reset flip-flops. In a preferred embodiment, the H rate signal provided to the PLD 56 represents the most significant bit (MSB) of an address, while the Q outputs of the vertical counting chain represent less significant bits. These addresses define any horizontal half line in a frame. The PLD 56 is used to decode which particular horizontal half line a pulse is to start and the particular horizontal half line it is desired to end. The decoded addresses are used to set or reset the PLD 56's flip-flops, depending on the polarity desired, on the positive-going edge of the $\overline{2H}$ pulse.

In this way the PLD 56 is able to create any vertical or frame rate pulse desired.

The vertical reset ($\overline{VR}$) output from the vertical reset circuit 36 is provided to the RESET input of the vertical counting chain 48 as well as to the SET input of the PLD 56 to synchronize the field or frame rate pulses output by the PLD 56 with the composite sync portion of the baseband video signal provided to the vertical pulse generator 10 of the present invention.

There has thus been shown a vertical pulse generator capable of differentiating between even and odd fields and of developing a vertical rate pulse to within a ½ horizontal line resolution. The vertical pulse generator makes use of a horizontal rate signal, a 2X horizontal rate signal, and a vertical reset signal (VR) in generating precisely defined field or frame rate pulses relative to a received composite video signal.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for processing a baseband video signal having alternately occurring even and odd fields and including a composite sync signal having an H signal component for generating a pulse to within a half horizontal line resolution within the even and odd fields, said apparatus comprising:

first means responsive to the composite sync signal for developing the H signal and a 2H signal;

counting means coupled to said first means and responsive to said 2H signal for successively developing a sequence of coded signals, wherein each of said coded signals identifies a respective half of a horizontal line within successive alternating even and odd fields of the baseband video signal; and decoding means coupled to said first means and to said counting means and responsive to said developed H signal and to said sequence of coded signals respectively output therefrom for developing a first selected decoded signal during each said even field of the baseband video signal and a second selected decoded signal during each said odd field of the baseband video signal.

2. Apparatus as in claim 1 wherein said first means comprises the combination of a phase lock loop locked in frequency and phase to the composite sync signal and a horizontal counter for dividing an output of the phase lock loop down to the H and 2H signals.

3. Apparatus as in claim 1 further comprising vertical reset means responsive to a vertical sync signal within the composite sync signal for developing a vertical rate signal, said vertical reset means coupled to said counting means and to said decoding means for providing said vertical rate signal thereto in synchronizing said first and second selected decoded signals with said vertical sync signal.

4. Apparatus as in claim 3 wherein said vertical reset means is further coupled to said first means and responsive to the 2H signal received therefrom for sampling the composite sync signal with a positive-going edge of the 2H signal.

5. Apparatus as in claim 1 wherein said counting means divides the 2H signal by 525 in generating a vertical rate signal.

6. Apparatus as in claim 1 wherein said first and second selected decoded signals represent a selected horizontal half line within said even and odd fields, respectively.

7. Apparatus as in claim 6 wherein said decoding means includes a plurality of addresses with a pair of said addresses defining the start and stop of one of said selected decoded signals, and wherein each of said coded signals includes a start and stop address for accessing a pair of said addresses within said decoding means.

8. Apparatus as in claim 7 wherein said decoding means comprises a programmable logic device having a plurality of data inputs to which the coded signals are provided and a clock input to which the 2H signal is provided.

* * * * *